Feb. 6, 1968
F. C. WALZ, JR., ET AL
3,367,072
VIBRATION ISOLATING MOUNT
Filed June 7, 1966
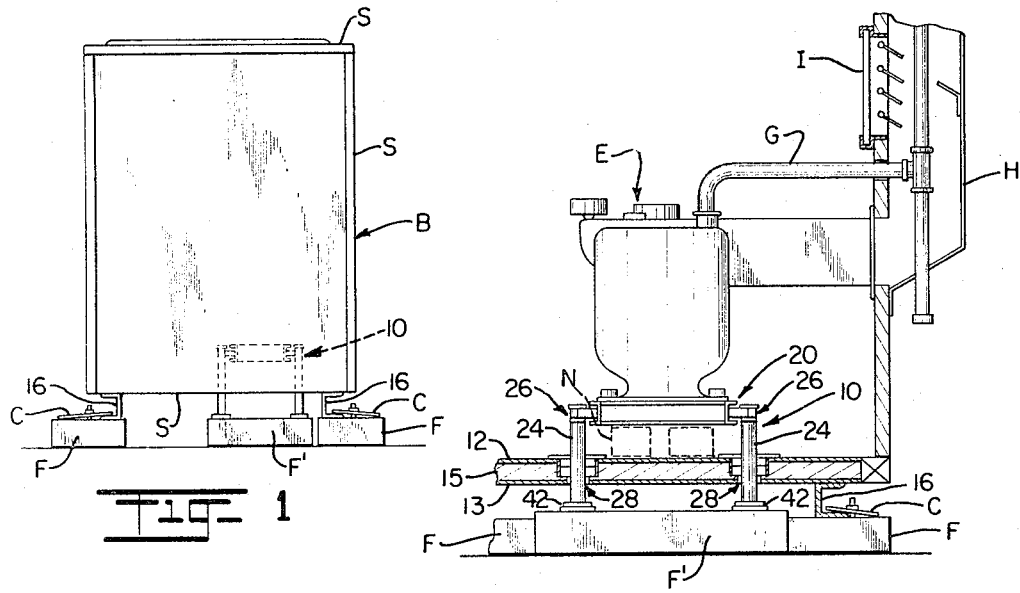
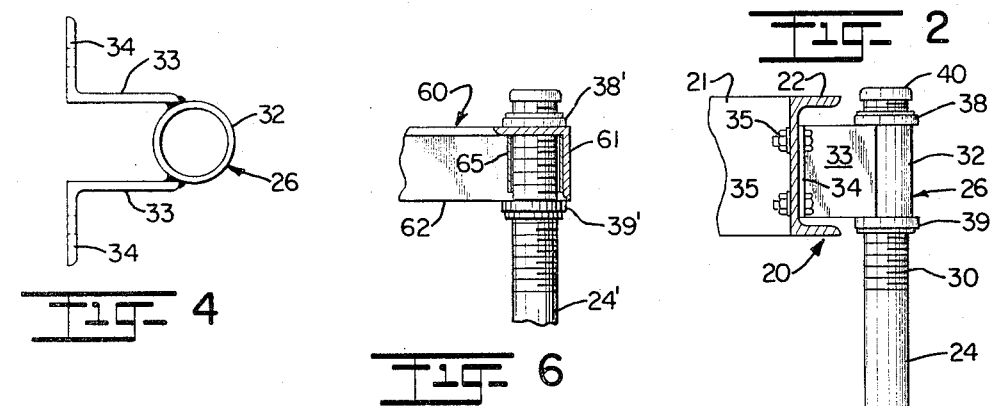
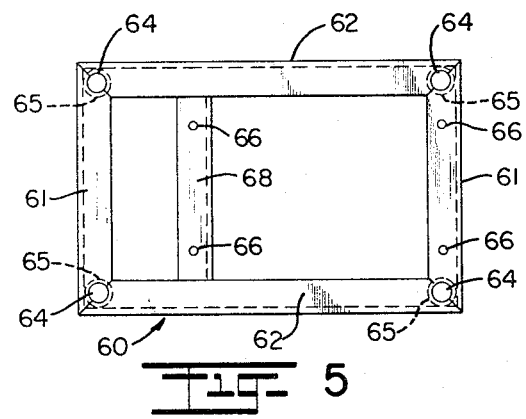
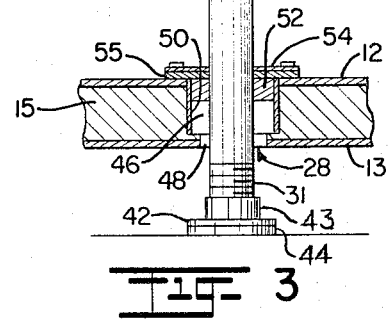
INVENTOR.
FRANK C. WALZ
JERRY B. DAVIS
BY
John E. Reilly
ATTORNEY

United States Patent Office 3,367,072
Patented Feb. 6, 1968

3,367,072
VIBRATION ISOLATING MOUNT
Frank C. Walz, Jr., Golden, and Jerry B. Davis, Lakewood, Colo., assignors to Armadillo Manufacturing Co., Denver, Colo., a corporation of Colorado
Filed June 7, 1966, Ser. No. 555,719
8 Claims. (Cl. 52—36)

ABSTRACT OF THE DISCLOSURE

The skid mount of the present invention isolates vibrations of a machine or other vibrating load from a building structure by supporting a machine on legs which extend through openings in the floor of the building and positioning the legs on a foundation externally of the building, and further by isolating vibrations transmitted to the supporting legs from the floor of the building.

This invention relates to a novel and improved vibration mount for dynamic loads within a building structure, and more particularly relates to a mount adapted for use in supporting an engine or other dynamic or vibrating load within a building structure in such a way as to isolate the vibrations from the building and to carry the weight and vibrations of the load directly into a foundation externally of the building structure.

The vibration mount of the present invention has particular utility in supporting vibrating loads within a prefabricated, portable building structure, although it will become apparent that the present invention has useful application in other types of permanent or portable building installations. The particular advantages and features of the present invention are best exemplified by reference to a prefabricated portable building structure as set forth and described in more detail in co-pending application for patent, entitled Prefabricated Portable Building, Ser. No. 529,028, filed Feb. 21, 1966 and assigned to the assignee of the present invention. In general, the building structure is so constructed and designed that it can be assembled and completely equipped at the factory prior to shipment. For example, in an engine-generator installation such equipment would include any necessary power panels, conduits, fans, conditioners, heaters as well as the engine-generator unit. In such an installation, it is important that the building and internal equipment be well-insulated and not be subjected to vibrations of the engine or other machinery within the building. Moreover, it is highly desirable that the weight of any heavy-duty equipment, such as, the engine and generator not be carried by the building structure especially when in operation and that to the extent possible the entire weight and vibrations of this equipment be transmitted away from the building structure into some external means of support.

It is therefore an object of the present invention to provide for a novel and improved engine or machine mount which will effectively isolate any vibrations from its housing structure; and specifically to provide a firm, rugged means of support for a machine or other vibrating load which enables factory installation within a building structure and which in use will transmit the weight and vibrations of the load away from the building to some external means of support.

It is a further object of the present invention to provide for a vibration-isolating mount for installation of a machine in a prefabricated portable building and specifically for installation of the machine prior to shipment of the building to its intended site of use; further, wherein the mount is readily conformable for use as a base support for machines of different sizes, weights and configurations, as well as being vertically adjustable to support a machine in predetermined spaced relation above the floor surface of the building.

It is an additional object of the present invention to provide an engine skid mount comprised of a minimum number of parts and which is simplified in construction and economical to manufacture and install, yet is rugged, durable and highly dependable in use.

In accordance with the present invention, preferred and modified forms of a skid mount have been devised and each is characterized by having an upper frame for mounting of a machine or other vibrating load thereon with adjustable legs being adapted for extension downwardly from the frame through openings in the floor section to rest on a foundation externally of the building. The legs are adjustable in length and the frame adjustable with respect to the legs in order to space the machine in desired relation above the floor surface; and an annular sleeve is positioned in the clearance space between each leg and each opening in the floor to isolate vibrations of the machine from the housing and also to establish sealed relation at the points of extension through the legs through the floor section.

The above and other objects, advantages and features of the present invention will become more readily appreciated and understood from a consideration of the following detailed description of a preferred form of the present invention when taken together with the accompanying drawings, in which:

FIGURE 1 is an end view of a prefabricated building structure and generally representing the disposition and arrangement of a vibration mount therein, in accordance with the present invention.

FIGURE 2 is an enlarged view in more detail of one form of vibration mount of an engine-generator installation within a prefabricated building structure.

FIGURE 3 is an enlarged view partially in section of the leg assembly for the mount shown in FIGURE 2.

FIGURE 4 is a plan view in detail of the adaptor assembly for the skid mount shown in FIGURE 2.

FIGURE 5 is a plan view of a modified form of vibration mount; and

FIGURE 6 is a fragmentary view partially in section of the leg assembly for the modified form shown in FIGURE 5.

Referring in more detail to the drawings, there is shown by way of illustrative example in FIGURE 1 a vibration skid mount 1 positioned within a prefabricated portable building structure B. Again by way of illustration and not limitation, the building structure B is most suitably of the form described in detail in the hereinbefore referred to co-pending application for patent entitled Prefabricated Portable Building and which includes fiberglass-covered roof, wall and floor panel sections S rigidly connected together, completely assembled and equipped prior to shipment to the intended point of use. As best seen from FIGURE 2, the floor panel section S may generally include an upper skin member 12 and a lower skin member 13 bonded to opposite sides of a frame 15. Skids 16 are fastened to the undersurface of the floor section in spaced parallel relation to one another and are aligned to rest on concrete piers or footings F with opposite ends of the skids being anchored to the footings by suitable means such as anchor bolts and clamping plates, designated at C in the drawing. In a typical engine-generator installation as shown in FIGURE 2, the engine-generator unit is represented at E and suitably includes flexible piping G and an exhaust duct H projecting through openings in one of the side panels. A fan I is attached to the side panel, and similarly any other static, non-vibrating equipment may be permanently and directly attached through or to the roof, wall or floor panel sections.

In accordance with the present invention, the engine-generator E is supported within the building structure by the skid mount 10 in such a way so as to isolate vibrations of the unit from the building structure and other equipment in the building, and specifically in such a way as to carry both the weight and vibrations of the unit directly onto a separate foundation of footing F' in spaced relation beneath the building structure. In FIGURES 2 to 4, the engine-generator unit E is shown as having an open rectangular base frame 20 including end frame members 21 and side frame members 22, each defined by skids in the form of channel beams. In turn, the skid mount 10 is made up of vertical posts or leg members 24 connected to opposite sides of the base frame and adjacent to its corners by means of an adaptor assembly 26. Generally the leg members are of sufficient length to support unit E in spaced parallel relation above the floor panel section S while extending vertically through openings 28 in the floor to rest on the external foundation member F'.

As best seen from FIGURE 3, each leg member 24 is defined by a heavy duty pipe having an upper threaded end 30 and a lower threaded end 31. In order to adjustably support the unit E on the legs 24, the upper adaptor assembly 26 includes a sleeve 32 disposed in outer concentric relation to the upper threaded end 30 and brackets 33 are attached by welding to diametrically opposed sides of the sleeve 32 for lateral or horizontal projection in spaced parallel relation into connected relation to one of the side frame members 22. Here, the brackets are formed of angle irons having oppositely directed flange portions 34 connected by bolts 35 to the side frame. The adaptor assembly 26 is releasably supported at the upper threaded end of the leg 24 by upper and lower sets of lock nuts 38 and 39 which can be independently, threadedly adjusted along the upper threaded end; an end cap 40 is positioned at the upper extremity of each leg. At the lower end of each leg 24, a base plate 42 is threadedly connected to the leg by a pipe coupling 43, and a compressible pad 44 is attached to its undersurface to rest upon and to frictionally engage the upper foundation surface.

Preferably, each opening in the floor section includes an upper enlarged, countersunk hole 46 extending from the upper surface through the greater thickness of the floor and a reduced countersunk hole 48 through the lower surface of the floor section. The enlarged opening 46 is dimensioned to leave ample clearance space upon extension of the leg through the opening for insertion of an outer relatively thin-walled sleeve 50 and an inner, relatively thick-walled washer 52, the latter being composed of a compressible rubber or rubber-like material. Here the washer is sized to be larger than the clearance space so as to require insertion under compression into the space between the post 24 and outer sleeve 50 and to insure a snug fit therebetween. In this relation, the washer is of a thickness less than the length of the hole 46 and thus is free to undergo limited movement or shifting within the clearance space. The washer is retained within the space 46 by the shoulder formed at the reduced opening 48 and an upper retainer plate 54 with gasket 55 which is secured to the upper floor surface in closely spaced surrounding relation to the leg. In this way, the compressible washer 52 will effectively serve as a vibration-isolating member between the leg and floor section, since by firmly engaging the leg while being free to undergo compression it will effectively absorb vibrations of the engine-generator unit applied through the legs. The lower flexible pad 44 will cooperate in absorbing vibrations and minimize any tendency of the legs to shift or move under vibration.

In the installation shown in FIGURE 2 the skid mount is comprised of a set of four leg assemblies with two each positioned on opposite sides of the base frame for the engine-generator unit E, although for larger units it will be evident that the number of legs may be increased as required. The legs are attached to the base frame by bolting the adaptor assembly brackets 33 adjacent to the ends of the side frame members 22. The leg members 24 are inserted through the openings 28 and the base portions threaded onto the lower ends, and the adaptor assemblies are placed on the upper threaded ends of the leg members. In addition, the sleeves 50, washers 52 and retainer plates 54 are assembled and attached as described. Preferably, this is all done at the factory prior to shipment, and most desirably shipping blocks are positioned between the floor and undersurface of the base frame, following which the base portions of the legs are threaded upwardly to engage the undersurface of the floor. At the site, concrete piers or foundation members are positioned beneath the skids 16 or other base support for the building, and a pier or foundation F' is positioned to serve as a separate base for the skid mount 10 in order to prevent any transmission of vibrations to the other foundation members. The leg members are then lowered through the openings 28, for example, by loosening the lock nuts 38 and 39 on opposite sides of the adaptor assembly 26 to the extent necessary for the base portion including the pad 44 to rest upon the foundation. The shipping blocks are then removed from beneath the base support frame so that the entire weight of the machine is carried into the foundation externally of the building. Thereafter the unit may be leveled, by suitable adjustment of the lock nuts, and the lock nuts are tightened to securely and rigidly position the unit E on the skid mount. When the engine unit is in operation, the washer elements 52 will serve not only to isolate vibrations of the engine and skid mount from the floor section, but will also establish sealed relation at the points of extension of the legs through the floor section.

In the modified form of invention shown in FIGURES 5 and 6, the skid mount 10 comprises the same basic combination and arrangement of elements as in the form of invention shown in FIGURES 2 to 4 and accordingly like parts are correspondingly enumerated. The modified form is designed primarily to be used where the engine unit or other dynamic load to be supported is not equipped with its own skid or base frame. Accordingly, the modified form of skid mount has a base frame 60 including end frame members 61 and side frame members 62 suitably formed of relatively thick angle irons as illustrated. The side and end frame members are rigidly joined together at the corners to form an open rectangular frame, and openings 64 extend through the top surface of the frame at each of the corners. In order to adjustably support the base frame on the leg members 24', vertical sleeves 65 are attached, such as, by welding to each inside corner of the frame in axial alignment with each of the openings 64; and lock nuts 38' and 39' are positioned on the upper opposite ends of each sleeve 65 to permit rigid but adjustable mounting of the unit in the manner described with reference to FIGURES 2 to 4. The end frame members are additionally provided with attachment holes 66 for the feet or base of the unit; or to accommodate loads or machines of different sizes a transverse supporting plate 68 may be located to extend between the side frame members for attachment and support of one end of the machine with the other being attached to one of the end frames.

From the foregoing, it will be seen that the forms of invention as herein described afford a highly simplified yet effective means of supporting dynamic loads within a building structure, and specifically will accomplish same in a manner to isolate vibrations of the load from the building while maintaining sealed relation with the floor section of the building. As described, this is of particular advantage in prefabricated, lightweight portable buildings and especially at remote locations where it is desirable to minimize maintenance and repair.

It is therefore to be understood from the foregoing that various modifications and changes may be made in the construction and arrangement of parts comprising the preferred form of the present invention without departing from the spirit and scope thereof as defined by the appended claims.

What is claimed is:

1. In a building structure for housing a vibrating load having a floor section supported in spaced relation above a foundation, a skid mount comprising an upper frame member adapted for supporting the vibrating load in spaced relation above the floor section within the building and a plurality of frame-supporting legs extending downwardly from said upper frame in load-balancing relation, said legs being adapted for passing in inner spaced concentric relation through openings in the floor section and having lower base portions resting on a foundation, and an annular sleeve composed of a compressible material being adapted for filling the annular clearance space formed between the wall of each opening and each leg to absorb the vibrations of the load transmitted to said frame-supporting legs.

2. In a building structure according to claim 1, said skid mount being supported on a separate foundation isolated from the foundation of the building structure.

3. In a building structure according to claim 1, said skid mount including adjustable locking means at the upper end of each of said legs being rigidly connected to said upper frame, said locking means being independently and vertically adjustable with respect to said legs to selectively position said upper frame in spaced relation above the floor section, and said lower base portions including vertically adjustable members at the lower ends of said legs.

4. In a building structure according to claim 1, said skid mount being further characterized by having said upper frame of open rectangular configuration including adjustable connecting means for attaching the load upon said upper frame, vertical sleeve members at each corner of said frame for slidable insertion of one of said legs therethrough and each of said legs being defined by a post having an upper threaded end, and threaded locking members at the upper threaded end of each post and at opposite ends of each of said sleeves to adjustably support said upper frame in predetermined spaced relation above the floor section.

5. In a building structure according to claim 1, said skid mount having retainer portions being adapted to retain each of said annular sleeves within each opening in the floor section, and said base portions for each leg being enlarged and being provided with flexible pads for yielding frictional support on the foundation.

6. In a prefabricated portable building having a floor panel and skid members arranged in spaced relation to one another on the undersurface of said floor panel to support the building in spaced relation above a foundation, the combination therewith of a skid mount, a skid mount foundation separate from that of the building foundation, said skid mount comprising an upper frame for supporting a machine within the building in spaced relation above the floor panel, vertical frame-supporting posts extending downwardly from said frame through openings in the floor panel, said posts having base support pads resting on the skid mount foundation and an annular washer element composed of a compressible rubber-like material being dimensioned for insertion under compression in the annular clearance space between the wall of each opening and each post whereby to isolate the vibrations and weight of said machine from the building structure.

7. In a prefabricated portable building according to claim 6, said skid mount being further characterized by having said upper support frame of open rectangular configuration including vertical sleeves at each corner of said frame, and said frame-supporting posts having upper threaded ends for insertion through said sleeves, and adjustable locking nuts at opposite ends of each sleeve.

8. In a prefabricated portable building structure according to claim 6 wherein each of the openings in the floor panel defines an upper enlarged clearance space and lower reduced clearance space in surrounding relation to each post, an outer thin-walled sleeve inserted in each of the enlarged clearance spaces and each of said annular washers being inserted in the enlarged clearance space and being of a thickness less than the depth of the enlarged clearance space.

References Cited

UNITED STATES PATENTS

| | | | |
|---|---|---|---|
| 1,752,266 | 3/1930 | Sloan | 248—20 X |
| 2,148,937 | 2/1939 | Gerb | 248—20 X |
| 2,174,216 | 9/1939 | Rosenzweig | 248—20 |
| 2,706,607 | 4/1955 | Withers et al. | 248—22 |

JOHN PETO, *Primary Examiner.*